US00RE33805E

United States Patent [19]

Yamanami et al.

[11] E Patent Number: Re. 33,805

[45] Reissued Date of Patent: Jan. 28, 1992

[54] COORDINATES INPUT APPARATUS

[75] Inventors: Tsuguya Yamanami, Kuki; Toshiaki Senda, Saitama; Azuma Murakami, Kawasaki, all of Japan

[73] Assignee: Wacom Co., Ltd., Tokyo, Japan

[21] Appl. No.: 576,050

[22] Filed: Aug. 31, 1990

Related U.S. Patent Documents

Reissue of:

[64] Patent No.: 4,902,858
Issued: Feb. 20, 1990
Appl. No.: 273,642
Filed: Nov. 10, 1988

U.S. Applications:

[63] Continuation-in-part of Ser. No. 95,691, Sep. 14, 1987, abandoned.

[51] Int. Cl.[5] ..... G08C 21/00

[52] U.S. Cl. ..... 178/19; 340/706

[58] Field of Search ..... 178/18, 19; 340/712, 340/686, 706, 811

[56] References Cited

U.S. PATENT DOCUMENTS

| | | | |
|---|---|---|---|
| 2,812,427 | 11/1957 | Magondeaux | 250/6 |
| 2,899,546 | 8/1959 | Hollmann | 250/6 |
| 2,958,781 | 11/1960 | Marchal et al. | 250/83.3 |
| 3,117,277 | 1/1964 | Magondeaux | 325/6 |
| 3,373,425 | 3/1968 | Barischoff | 343/6.8 |
| 4,678,870 | 7/1987 | Taguchi et al. | 178/19 |
| 4,697,050 | 9/1987 | Farel et al. | 178/18 |
| 4,704,501 | 11/1987 | Taguchi et al. | 178/19 |
| 4,786,765 | 11/1988 | Yamanami et al. | 178/19 |

FOREIGN PATENT DOCUMENTS 59-3537 1/1984 Japan .

*Primary Examiner*—Stafford D. Schreyer
*Attorney, Agent, or Firm*—Lowe, Price, LeBlanc & Becker

[57] ABSTRACT

A system for detecting the types and statuses of position designating devices is incorporated in a coordinates input apparatus having a tablet constituting a coordinates input section, a plurality of position designating devices of different types, and a position detecting circuit for driving the tablet and detecting positions at which coordinates are input by the position designating devices. The system has an antenna coil disposed around a coordinates input range of the tablet, and a tuning circuit disposed in each of the position designating devices for transmitting radio waves in response to an external signal at an individual frequency determined in accordance with the type of the corresponding position designating device. An AC signal of predetermined frequencies is applied to the antenna coil so that it transmits radio waves. The types and statuses of the position designating devices are detected by judging the condition of the position designating circuits from signals within the antenna coil while the transmission of the radio waves is suspended. With this system, the types and statuses of a plurality of position designating devices can be detected without having to connect the devices to other circuits via cords or provide them with complicated signal generating circuits and power sources such as batteries.

27 Claims, 6 Drawing Sheets

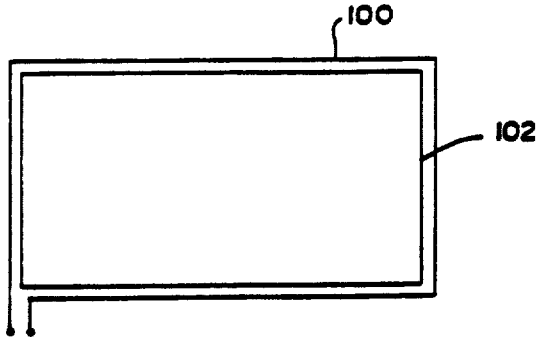
FIG. 6
FIG. 7
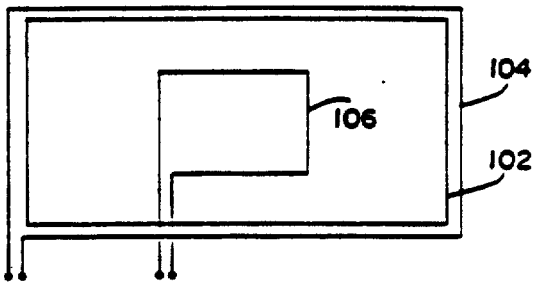
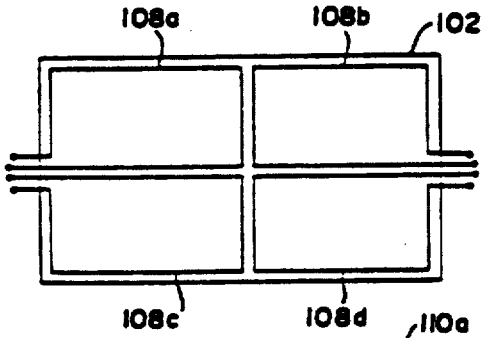
FIG. 8
FIG. 9
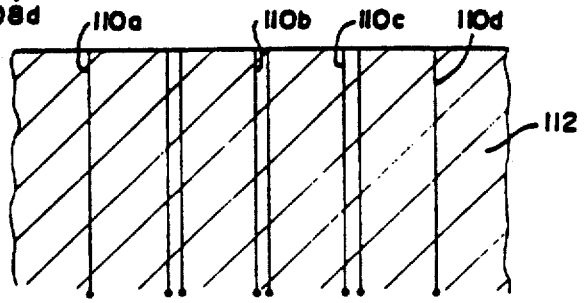

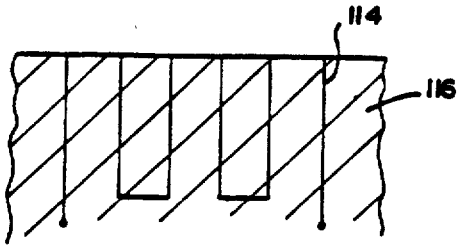
FIG. 10
FIG. 11
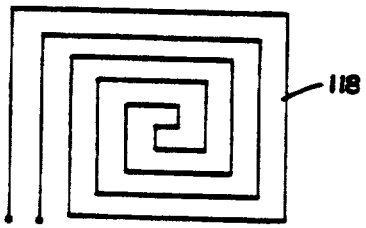
FIG. 12
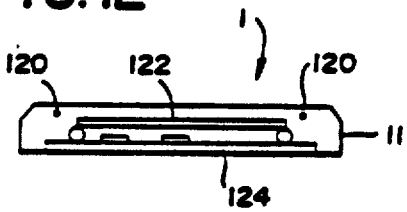
FIG. 13a
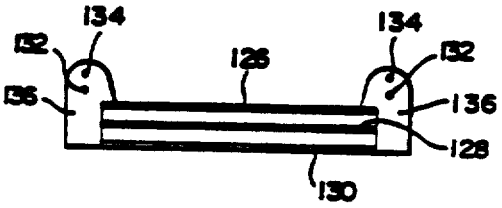
FIG. 13b
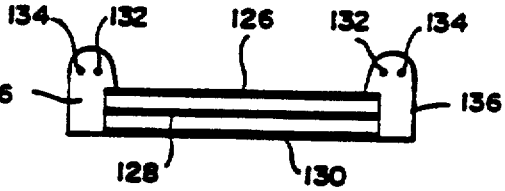

COORDINATES INPUT APPARATUS

Matter enclosed in heavy brackets [ ] appears in the original patent but forms no part of this reissue specification; matter printed in italics indicates the additions made by reissue.

This application is a continuation-in-part, of Ser. No. 095,691, filed Sept. 14, 1987 now abandoned.

BACKGROUND OF THE INVENTION

1. Field of the Invention

The present invention relates to detection of the status of a plurality of position designating devices of different types which are used in a coordinates input apparatus, and more particularly to a system for detecting the status and type of each of the position designating devices which has designated only a position at which coordinates are to be input.

2. Description of the Related Art

Hitherto, a system has been incorporated in a coordinates input apparatus for detecting the status (hereinafter referred to as the "pen-down status") of a position designating device which has designated only a position on a tablet at which coordinates are to be input. The arrangement of this system has been such that a switching means is provided in the position designating device and is turned on (or off) only in the pen-down status, and that timing signals based on the ON (or OFF) condition of the switching means are transmitted to a position detecting circuit via a cord or by the use of ultrasonic waves or infrared rays.

However, with the arrangement in that timing signals are transmitted from the position designating device via a cord, there has been a drawback in that the cord causes a hindrance to the operating efficiency of the position designating device. In addition, with the arrangement in that timing signals are transmitted by the use of ultrasonic waves or infrared rays, a transmitter, a signal generating circuit, a battery, and the like must be provided in the position designating device per se. Hence, the above-described conventional arrangement involved the following problems. The arrangement of the position designating device becomes complicated and large in size and weight, thereby lowering the operating efficiency of the position designating device. In addition, there has been no means to differentiate, with ease, between a plurality of position designating devices of different types.

SUMMARY OF THE INVENTION

A primary object of the present invention is to provide a system which is, when used, capable of differentiating between the types of position designating devices, and capable of detecting factors concerning the position designating devices, such as the position and status thereof, without causing any decrease in the operating efficiency of the position designating devices.

In order to achieve this object, according to the present invention, there is provided a system for detecting the status of position designating devices, which is incorporated in a coordinates input apparatus having a tablet constituting a coordinates input section, a plurality of position designating devices of different types such as stylus pens, and a position detecting circuit adapted to drive the tablet and detect positions at which coordinates are input by the position designating devices. The system comprises an antenna coil disposed around a coordinates input range of the tablet; and a tuning circuit disposed in each of the position designating devices, the tuning circuit including a coil and capacitors which constitute a set and being adapted to transmit radio waves in response to an external signal at an individual frequency determined in accordance with the type of the corresponding position designating device, wherein an AC signal having frequencies which are identical to the individual frequencies of the tuning circuits is intermittently and sequentially applied to the antenna coil so that radio waves are transmitted by the antenna coil, and, when the transmission of the radio waves is suspended, signals generated by the tuning circuits in response to the radio waves are received by the antenna coil, thereby enabling detection of the position and operating status of the position designating devices, and the correspondence of the frequencies of the received signals with the types of the position designating devices is determined to differentiate between the types of the position designating devices.

With the system in accordance with the present invention, each of the tuning circuits is provided with a switch, and, when each of the switches is turned on, each of the tuning circuits in the corresponding designating devices transmits a signal in response to the signal of the frequency that is identical with the individual frequency of the tuning circuit of the corresponding position designating device, from among signals of different frequencies sequentially transmitted by the antenna coil. The antenna coil receives these signals, thereby enabling detection of the position and operating status of the position designating devices. The correspondence of the received signals with the types of the position designating devices is determined, thereby differentiating between the types of the position designating devices.

By virtue of this arrangement of the system in accordance with the present invention, no cord is necessary between the position designating devices and other circuits. It suffices to provide tuning circuits each including a coil and capacitors, thus making unnecessary any complicated signal generating circuit or battery, which the prior art necessitated. In addition, since the type of each of the position designating devices is also detected without using any cord, the position designating devices can have a very high operating efficiency, while the position designating devices may be input pens of different types depending on, for instance, the respective display colors they correspond, thereby enabling selection of the display color by means of the switches.

The above and other objects, features, and advantages of the present invention will become apparent from the following description.

BRIEF DESCRIPTION OF THE DRAWINGS

FIG. 6 shows a first disposition of an antenna coil with respect to a coordinates input range;

FIG. 7 shows disposition of antenna coils with respect to a coordinates input range;

FIG. 8 shows yet another disposition of antenna coils with respect to a coordinates input range;

FIG. 9 shows yet a further disposition of antenna coils with respect to a coordinates input range;

FIG. 10 shows an additional disposition of an antenna coil with respect to a coordinates input range;

FIG. 11 shows yet a different disposition of an antenna coil with respect to a coordinates input range;

FIG. 12 shows a cross-sectional view of a tablet and the placement of the antenna coil therein;

FIG. 13a shows a cross-sectional view of a different type of tablet, with respective positioning of the transmission and receiving coils; and FIG. 13b is a cross-sectional view of the same tablet as FIG. 13a, but with different placement of the transmission coils and receiving coils.

DESCRIPTION OF THE PREFERRED EMBODIMENT

Figure 1:
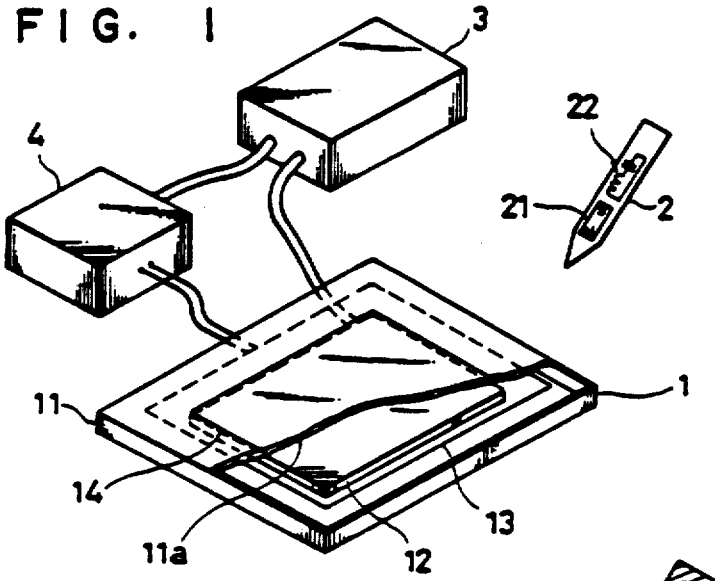
FIG. 1 is a perspective view schematically illustrating a coordinates input apparatus to which an embodiment of the present invention is applied.

FIG. 1 illustrates a coordinates input apparatus in which a system for detecting the status of position designating devices in accordance with an embodiment of the present invention is incorporated. In this figure, reference numeral 1 denotes a tablet; 2, a plurality of position designating devices (hereinafter referred to as the "input pens") of different types, only one of which is shown in the figure; 3, a position detecting circuit; and 4, a timing control circuit.

The tablet 1 comprises a casing 11 of a non-magnetic metal, and a tablet body 12 and an antenna coil 13 which are accommodated in the casing 11. The tablet 12 is connected to the position detecting circuit 3, while the antenna coil 13 is connected to the timing control circuit 4.

The tablet body 12 is driven by the position detecting circuit 3 and constitutes a detecting section for detecting positions designated by the input pens 2. The tablet body 12 is disposed substantially in the center of the casing 11. The casing 11 has a frame 14 which is drawn thereon to indicate a range within which coordinates can be input thereto.

As for the tablet body 12 and the position detecting circuit 3, it is possible to use, for instance, those described in Japanese Patent Application No. 238532/1983 "Coordinate Position Detection Device" (see Japanese Patent Laid-Open No. 129616/1985) and Japanese Patent Application No. 33083/1984 "Position Detection Device" (see Japanese Patent Laid-Open No. 176134/1985), both filed by the present applicant. The arrangement of the former device is such that a multiplicity of magnetostrictive transmitting media is disposed parallel with the surface of a tablet body 12 in such a manner that some of the magnetostrictive transmitting media are disposed at right angles with others, and magnetostrictive vibrations are periodically imparted to each of these media from one end thereof to the other end. When an input pen 2 approaches the media, the magnetostrictive vibration at that location is enhanced by means of a bar magnet provided in the pen. By making use of the phenomenon, a position detection circuit 3 detects the X-Y coordinates of the location on the basis of the time duration of propagation to that location. On the other hand, the arrangement of the latter device is such that magnetostrictive media, some of which are disposed at right angles with others, are excited by an AC current, and voltages induced therein are detected by detection coils. X-Y coordinates are detected by making use of the phenomenon in which, when a similar input pen approaches the media, the permeability of the magnetostrictive media changes locally thereby causing a resultant change in the induced voltages.

The antenna coil 13 comprises a conductive wire which is provided with an insulation coating such as polyvinyl chloride and is disposed around the coordinate input range of the tablet body 12, i.e., in this embodiment, on the rear surface of the upper panel 11a of the casing 11 around the frame 14. Although the conductive wire is given one turn in the illustrated example, a plurality of turns may be provided, as required.

An example of an antenna coil being disposed approximately around the circumference of a coordinates input range is illustrated in FIG. 6 where antenna coil 100 is shown to surround the periphery of a coordinates input range 102.

It should be appreciated, however, that instead of the antenna coil surrounding the coordinates input range, the antenna coil may also be disposed inside and/or outside of the coordinates input range. Or, for that matter, a plurality of antenna coils may also be used. This is illustrated, for example, in FIG. 7 where, in addition of an antenna coil 104 surrounding coordinates input range 102, an antenna coil 106 is disposed at the center of coordinates input range 102.

The disposition of a plurality of coils 108a and 108d each disposed approximately around a quarter section of coordinates input range 102 is shown in FIG. 8. It should be appreciated that although the coils are shown to be disposed inside coordinates input range 102, in actuality, the sides of the coils near the periphery of coordinates input range 102 may overlap respective portions of the periphery or may be disposed outside of the same respective portions. Furthermore, it should be appreciated that although the loops formed by cells 108a to 108d are shown to be disposed next to each other, in practice, these coils may superpose over each other, i.e. the loop formed by coil 108a may be superposed over the loop formed by 108d, or vice versa.

FIG. 9 shows the disposition of a plurality of antenna coils 110a to 110d arranged side-by-side with respect to a coordinates input range 112. Although four antenna coils are shown, it should be appreciated that the number of coils is arbitrary and that more than or less than four antenna coils may be used.

Yet a further disposition of an antenna coil 114, in the form of the teeth of a comb, is shown to be disposed over a coordinates input range 116 in FIG. 10. Here, again, it should be appreciated that although coordinates input range 116 is shown to be extending away from antenna coil 114, in actuality, such may not be the case. Or, for that matter, portions of antenna coil 114 may not even be disposed within coordinates input range 116.

An antenna coil 118, in the form of a spiral, is shown in FIG. 11. Like the other antenna coils shown in FIGS. 6 to 10, antenna coil 118 may be placed completely within a coordinates input range or may have portions thereof disposed to the outside of the coordinates input range. For the sake of simplicity of illustration, the coordinates input range is not shown.

Returning to FIG. 1, it can be seen that each of the input pens 2 accommodates therein a magnetism generator for designating a position, which is, for instance, a bar magnet 21 and a tuning circuit 22 including a coil and capacitors.

A cross-sectional view of tablet 1 is shown in FIG. 12 where it can be seen that an antenna coil 120, which may be in the shape of antenna coil 100 shown in FIG. 6, is positioned above a sensor board 122, which in turn is superposed over a circuit board 124. All of these components are enclosed in casing 11.

In the instance where the tablet is actually a blackboard, such as those shown in FIGS. 13a and 13b, the disposition of respective receiving coils and transmission coils are shown to be located in a plane(s) above the input board 126. For example, for the FIG. 13a input tablet, input board 126, which may be equated with a blackboard for writing on and which may be made out of an enameled aluminum plate, is superposed over a first sensor board 128 and second sensor board 130. Sensor board 128 and 130 may be used to sense movements in the X and Y directions, respectively. As shown in FIG. 13a, receiving coils 132 are located underneath transmission coils 134.

For the FIG. 13b embodiment, it can be seen that transmission coils 134 are located to the outside of receiving coils 132. Although so structured, it should be appreciated that, as long as the coils are positioned above input board 126, insofar as board 126 may be made up of metal, both the transmission coils and the receiving coils can be placed within housing 136.

Figure 2:
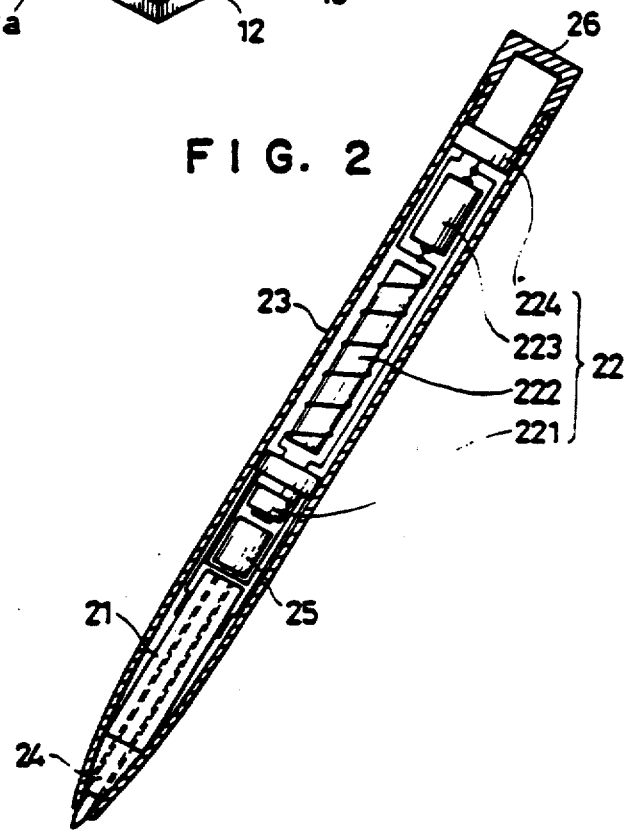
FIG. 2 is a sectional view of an input pen.
Figure 3:
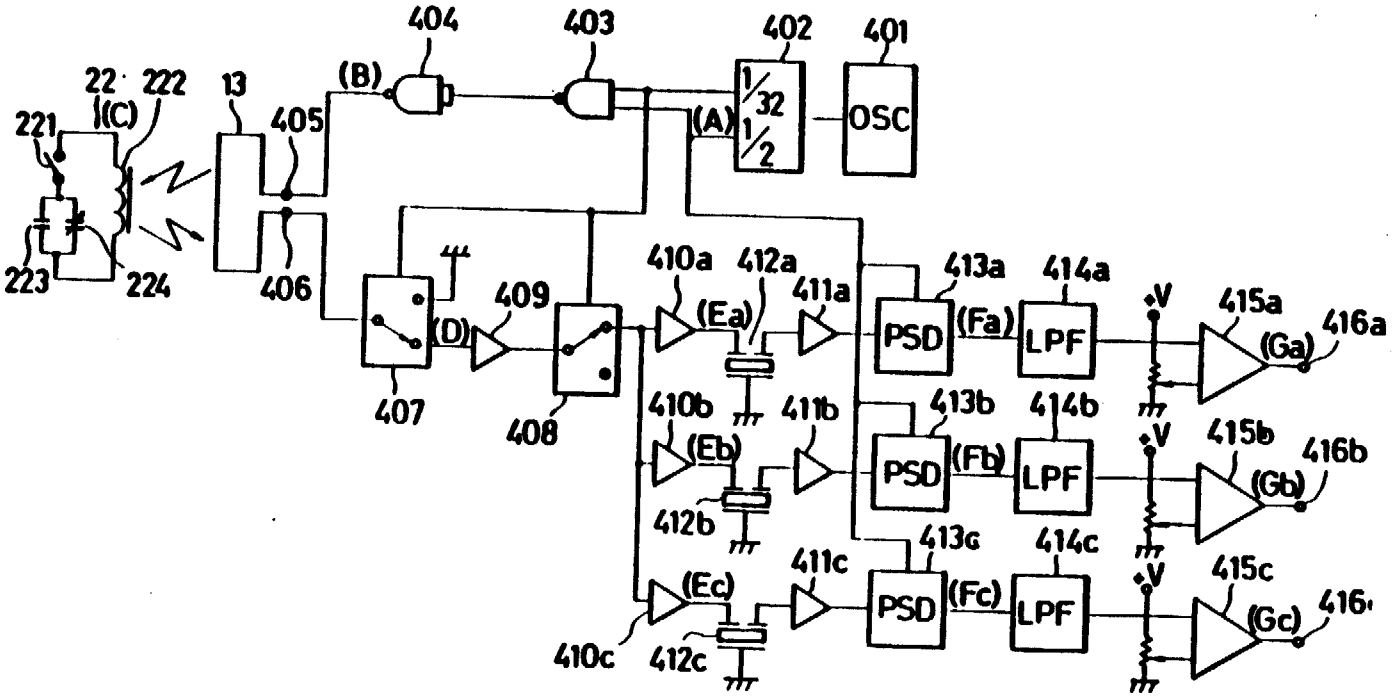
FIG. 3 is a block diagram of a timing control circuit.

FIG. 2 illustrates details of the structure of the input pen 2. A pen shaft 23 is formed of a non-metal material such as a synthetic resin and receives therein an integral structure formed by combining a core member 24, such as a ball-point pen, the bar magnet 21 having a through-hole slidably receiving the core member 24, a coil spring 25, and the tuning circuit 22 constituted by a switch 221, a coil 222 wound around an iron core, two capacitors 223 as shown in FIG. 3, and a variable capacitor 224 provided for the fine tuning. A cap 26 is provided at the rear end of the pen shaft 23.

The arrangement of the switch 221 is such that, when the tip of the core member 24 is pressed against the surface of the tablet so that the core member 24 slides into the pen shaft 23, the switch 221 is turned on by being pressed by the rear end of the core member 24 via the coil spring 25. As is also shown in FIG. 3, the capacitor 223 and the variable capacitor 224 are connected to each other in parallel so as to form a parallel circuit. One end of the coil 222 is connected to one end of the parallel circuit via the switch 221, while the other end of the coil 222 is connected to the other end of the parallel circuit, thereby constituting the parallel resonance circuit 22. The resonance circuit 22 provided within each of the input pens 2 has an individual resonance frequency determined in accordance with the type of the input pen 2 corresponding, for example, in accordance with the predetermined different display color of the input pen 2. More specifically, the capacitances of the capacitors 223 of the resonance circuits 22 are varied so that the resonance circuit 22 of the input pen for producing displays in "black" has a resonance frequency of 450 KHz, the resonance circuit 22 of the input pen for producing displays in "red" has a resonance frequency of 500 KHz, and the resonance circuit 22 of the input pen for producing displays in "blue" has a resonance frequency of 550 KHz.

It should be noted that values of each of the resonance circuits 22 are selected in such a manner as to resonate (to be tuned) with the radio waves of the identical frequency from among radio waves transmitted from the antenna coil 13 at respective frequencies determined in accordance with the types of the input pens 2.

FIG. 3 shows details of the arrangement of the timing control circuit 4. In the drawing, reference numeral 401 denotes an oscillator (OSC); 402, a frequency demultiplication counter; 403 and 404 denote NAND gates; 405 denotes a transmission terminal; 406, a reception terminal; 407 and 408 denote reception changeover switches 409, 410a, 410b, 410c, 411a, 411b and 411c, amplifiers; 412a, 412b and 412c, mechanical filters; 413a, 413b and 413c, phase detectors (PSDs); 414a, 414b and 414c, low-pass filters (LPFs); 415a, 415b and 415c, comparators; and 416a, 416b and 416c, output terminals.

Figure 4:
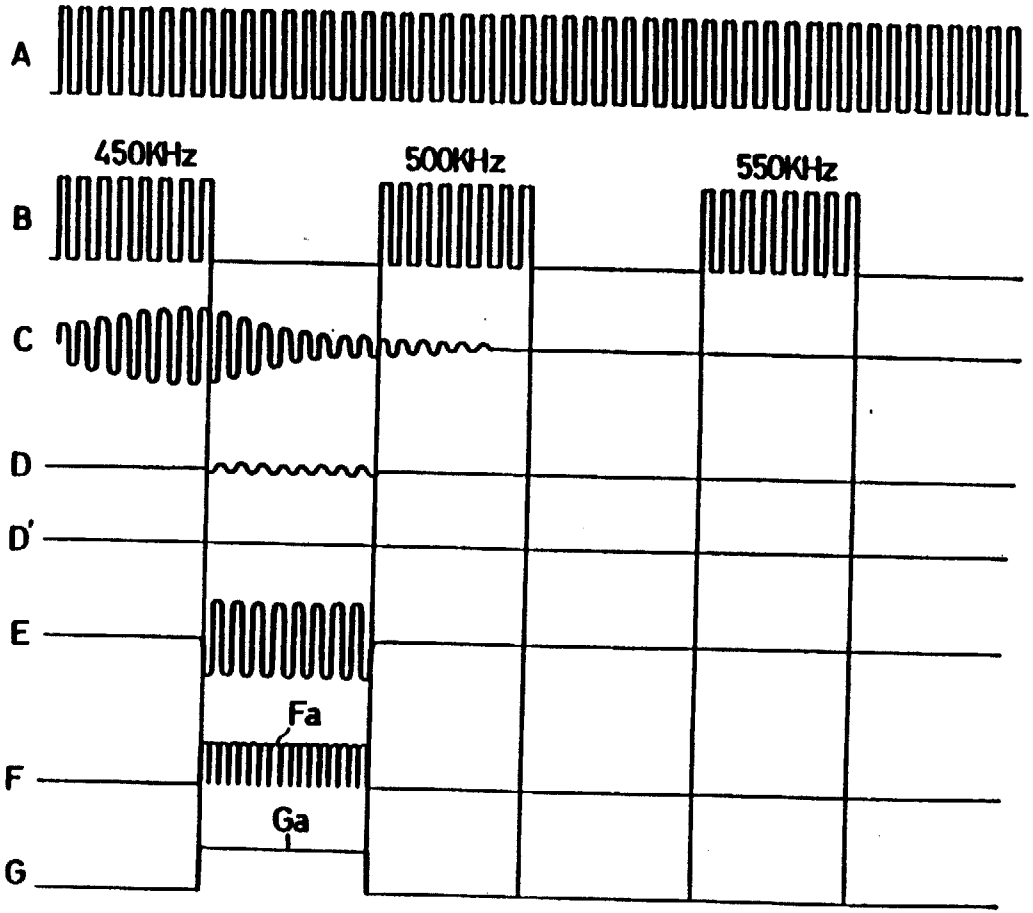
FIG. 4 is a diagram illustrating waveforms of signals from various parts shown in FIG. 3.

FIG. 4 is a waveform diagram of signals in various parts shown in FIG. 3. Hereinafter, a detailed description will be made of operation.

The oscillator 401 sequentially generates a plurality of groups of clock pulses each comprising a predetermined number of clock pulses having the frequency of 0.9 MHz, 1 MHz, or 1.1 MHz. The frequency demultiplication counter 402 demultiplies the frequencies of the clock pulses into ½ and 1/32. A pulse signal A having the frequencies of 450 KHz, 500 KHz, and 550 KHz, which has been obtained by demultiplying the frequencies of the clock pulses into ½, is input to one input terminal of the NAND gate 403, while a pulse signal having the frequencies of 28.12 KHz, 31.25 KHz, and 34.38 KHz (the respective pulse durations being 17.8 μs, 16 μs, and 14.5 μs, which has been obtained by demultiplying the frequencies of the clock pulses into 1/32, is input to the other input terminal of the NAND gate 403. The output of the NAND gate 403 is sent to the NAND gate 404, and becomes a signal B which intermittently sends pulses having the pulse duration of 17.8 μs and the frequency of 450 KHz, pulses having the pulse duration of 16 μs and the frequency of 500 KHz, and pulses having the pulse duration of 14.5 μs and the frequency of 550 KHz, as shown in FIG. 4. The changeover in frequency of the clock pulses output from the oscillator 401 takes place in conformity with the period of the pulses obtained by the frequency demultiplication into 1/32. In FIG. 4, the widths of the pulses having different frequencies are illustrated as the same width for the sake of convenience the illustration.

The signal B is sent to the antenna coil 13 via the transmission terminal 405 and is transmitted therefrom as radio waves. At this point, if the switch 221 is turned on in the tuning circuit 22 of the selected input pen 2, the tuning circuit 22 resonates with the radio waves of the frequency that is identical with the resonance frequency of its own, from among the radio waves transmitted from the antenna coil 13. It is assumed, for example, that the selected input pen 2 corresponds to the display color of "black" and that the tuning circuit of this input pen 2 resonates with radio waves of 450 KHz. Since the tuning circuit 22 continues to resonate while its output is being attenuated even after the transmission from the transmission side has been suspended, the tuning circuit 22 generates a signal C as shown in FIG. 4. The signal C is transmitted as radio waves from the coil 222 and is received by the antenna coil 13.

Since the reception changeover switches 407 and 408 have already been changed over by the pulse signal obtained by the aforementioned frequency demultiplication into 1/32, these switches 407 and 408 receive signals from the reception terminal 406 only during the period in which the transmission is suspended. The thus received signal will be a signal D as shown in FIG. 4 if the switch 221 of the tuning circuit 22 is turned on, while it will be a signal D' as also shown in FIG. 4 if that switch 221 is turned off.

Figure 5:
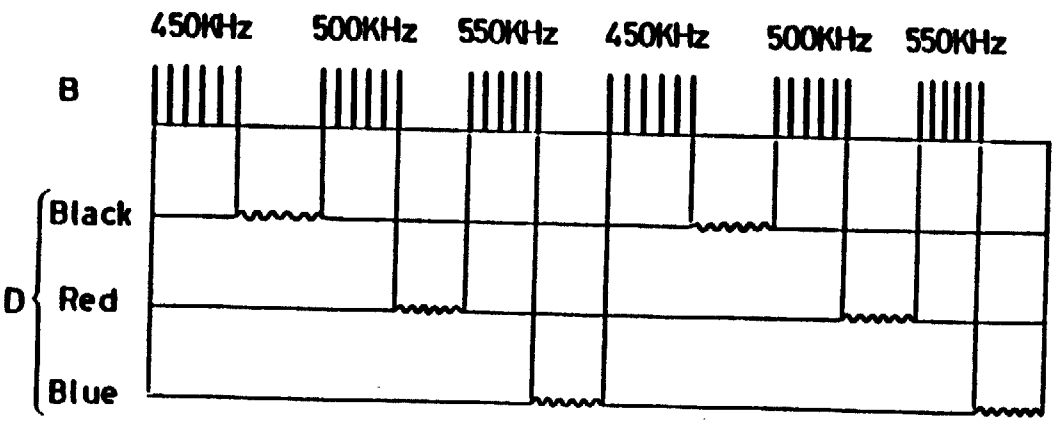
FIG. 5 is a timing chart showing the relationship between the reception and the transmission of signals shown in FIG. 4.

FIG. 5 illustrates the timing at which various signals are output from the transmission side and the reception side. As shown in this figure, the reception signal D is generated in repeated response to the transmission signal B transmitted from the antenna coil 13, in such a manner that the tuning circuit 22 of the input pen 2 corresponding to the display color of "black" responds to the pulses of 450 KHz, the tuning circuit 22 of the input pen 2 corresponding to the display color of "red" responds to the pulses of 500 KHz, and the tuning circuit 22 of the input pen 2 corresponding to the display color of "blue" responds to the pulses of 550 KHz.

The reception signal D is amplified by the amplifiers 409, 410a, 410b, and 410c, so as to become a signal E (signals Ea, Eb, and Ec on the output side of the amplifiers 410a–410c). These signals Ea, Eb, and Ec are passed through the mechanical filters 412a, 412b, and 412c, respectively, in which noise components are removed while the signal components of the respective resonance frequencies are passed therethrough. The signals are then sent respectively to the phase detectors 413a, 413b, and 413c via the amplifiers 411a, 411b, and 411c. The amplifiers 410a, 410b, and 410c have the auto-level-control function and act to bring the amplitude of the signals to a constant level.

The pulse signal A has already been input to the phase detectors 413a, 413b, or 413c. Accordingly, if the phase of the input signal E coincides with the phase of the pulse signal A, these phase detectors outputs a signal F (signals Fa, Fb, or Fc on the output side of these phase detectors 413a–413c). A lower half of the signal F is inverted, as shown in FIG. 4.

The signal F is converted into a flat signal by means of the low-pass filters 414a, 414b, and 414c each having a sufficiently low cut-off frequency and is input to one input terminal of the comparators 415a, 415b, and 415c. A predetermined threshold voltage + VT has been input to each of the other input terminals of the comparators 415a, 415b, and 415c, and the output of the low-pass filters 414a, 414b, and 414c is compared with the threshold voltage + VT. In this example, the signal Fa, which has passed through the mechanical filter 412a et seq. in accordance with the signal of 455 KHz, is fed to the output terminal 415a as a high (H) level signal Ga. At the same time, signals Gb and Gc of low (L) level are fed to the other output terminals 416b and 416c, thereby keeping these two output terminals at "0" level. From these facts, it is determined that the input pen 2 in use is the one corresponding to the display color "black".

On the other hand, if the signal D' is received, both signals E and F will be at "0" level, so that signals Ga, Gb, and Gc (not shown in FIG. 4), which are also at low (L) level, are generated, thereby enabling the operating status of the switches 221 to be detected.

If the arrangement of the system is such that the signals Ga, Gb, and Gc are sent to the position detecting circuit 3 on the basis of a definition that, when one of these signals is at high level, this means that the corresponding input pen 2 is in the "pen-down" status, and that, when the signal is at low level, this means that the corresponding input pen is not in the "pen-down" status, the input of a position can be effected by operating the input pens 2 with respect to the tablet 1 and simply by pressing the tip of one of the input pens 2 against the tablet 1 at a position where coordinates are to be input.

Although in the foregoing embodiment, the signal E is detected by distributing it to three lines in accordance with the resonance frequencies, it is possible to provide an alternative arrangement in which a single line is provided by using a mechanical filter having the range of between 450 KHz and 550 KHz in place of the three mechanical filters 412a, 412b, and 412c, and in which the oscillator 401 is adapted to generate a signal for discriminating each of the frequencies or a timing signal for changing over the frequencies, so that the types of the input pens can also be discriminated therebetween from the timing and the output of the comparator.

We claim:

1. In a coordinates input apparatus having a tablet constituting a coordinates input section, a plurality of different types of position designating devices, and a position detecting circuit adapted to drive said tablet and detect positions at which coordinates are input by said position designating devices, a system for detecting the statuses of said position designating devices comprising:

at least one antenna coil positioned relative to a coordinates input range of said tablet;

wherein each of said position designating devices has a tuning circuit disposed therein, each of said tuning circuits including a coil and capacitors working cooperatively to transmit radio waves in response to an external signal at a frequency predetermined in accordance with a corresponding type of position designating device;

wherein an AC signal having a plurality of frequencies each being identical to an individual frequency of one of said tuning circuits is intermittently and sequentially applied to said antenna coil so that radio waves are transmitted by said antenna coil, and, when the transmission of said radio waves is suspended, signals generated by said tuning circuits in response to said radio waves are received by said antenna coil to enable detection of the respective positions and operating statuses of said position designating devices; and wherein a determination of the correspondence of the frequencies of the received signals with the types of position designating devices is used to effect a differentiation between the different types of said position designating devices.

2. A system according to claim 1, further comprising a switch disposed in each of said tuning circuits for turning on or off the connection between said coil and said capacitors; and wherein, when it is required to designate only a position at which coordinates are to be input, said position designating devices are used by turning on or off said switches.

3. A system according to claim 1, wherein said tablet further comprises a casing made of a non-metallic material such as a synthetic resin, and a tablet body, in addition to said antenna coil, said casing accommodating said tablet body and said antenna coil.

4. A system according to claim 1, wherein each of said position designating devices further comprises, in addition to said tuning circuit, a magnetism generator for designating positions.

5. A system according to claim 1, wherein said antenna coil comprises a conductive wire provided with an insulation coating such as polyvinyl chloride, said conductive wire being disposed around a coordinates input range of said tablet.

6. A system according to claim 1, wherein said tuning circuit has a variable capacitor.

7. The system of claim 1, wherein the antenna coil is disposed around the periphery of the coordinates input range.

8. The system of claim 1, wherein the antenna coil is disposed inside the periphery of the coordinates input range.

9. The system of claim 1, wherein the antenna coil is tooth-shaped for superposing over or below the coordinates input range.

10. The system of claim 1, wherein the antenna coil is spirally-shaped for superposing over or below the coordinates input range.

11. The system of claim 1, further comprising at least two antenna coils one of which is disposed inside the coordinates input range and the other of which is disposed around the coordinates input range.

12. The system of claim 1, further comprising a plurality of antenna coils each for forming a loop disposed around a corresponding portion of the coordinates input range.

*13. A method of identifying which one of plural objects is in proximity to a tablet and the position of the one object relative to the tablet, each of the objects including a tuned circuit having a different resonant frequency, comprising the steps of supplying AC energy at the different resonant frequencies to a coil in the tablet, the tuned circuit on the particular object in proximity to the coil having substantially the same frequency as the AC energy supplied to the coil causing a change in the current flowing in the coil at said same frequency, sensing the change in the current flowing in the coil at said same frequency, responding to the current change at said same frequency to indicate the particular object having the tuned circuit with the same resonant frequency as the frequency of the applied AC energy, and detecting the position of the identified object by coupling energy between the object and the tablet, said tablet including a two dimensional array of detectors, at least some of which interact with the coupled energy.*

*14. The method of claim 13 wherein the energy at the different frequencies is sequentially supplied to the coil.*

*15. The method of claim 14 wherein the change is detected by supplying the coil during a first interval with the AC energy at one of the predetermined frequencies, and responding to energy coupled back to the coil from the tuned circuit during a second interval while the coil is not supplied with the AC energy at the one predetermined frequency.*

*16. In combination, a tablet including a coil, plural objects adapted to be selectively in proximity to the tablet, each of the objects including a tuned circuit having a different resonant frequency, means for supplying AC energy at the different resonant frequencies to the coil, the tuned circuit on the particular object in proximity to the tablet having substantially the same frequency as the AC energy supplied to the coil causing a change in the current flowing in the coil at said same frequency, means for sensing the change in the current flowing in the coil at said same frequency, means responsive to the current change at said same frequency for indicating the particular object having the tuned circuit with the same resonant frequency as the frequency of the applied AC energy and means for detecting the position of the identified object relative to the tablet, said position detecting means coupling energy between the object and the tablet, said tablet including a two-dimensional array of detectors at least some of which interact with the coupled energy.*

*17. The combination of claim 16 wherein the energy at the different frequencies is sequentially supplied to the coil.*

*18. The combination of claim 17 wherein the change is detected by supplying the coil during a first interval with the AC energy at one of the predetermined frequencies, the means for sensing being activated to be responsive to energy coupled back to the coil from the tuned circuit during a second interval while the coil is not supplied with the AC energy at the one predetermined frequency.*

*19. Apparatus for determining which one of plural objects is in proximity to a region and for determining the position of said one object relative to the region, each of the objects including a tuned circuit having a different resonant frequency, comprising a tablet defining the region, the tablet including a coil, means for supplying AC energy at the different resonant frequencies to the coil, the tuned circuit on the particular object in the region having substantially the same frequency as the AC energy supplied to the coil causing a change in the current flowing in the coil at said same frequency, means for sensing the change in the current flowing in the coil at said same frequency and responding to the current change at said same frequency to indicate the particular object having the tuned circuit with the same resonant frequency as the frequency of the applied AC energy, and means for detecting the position of the identified object relative to the tablet, said position detecting means coupling energy between the object and the tablet, said tablet including a two dimensional array of detectors at least some of which interact with the coupled energy.*

*20. The apparatus of claim 19 wherein the energy at the different frequencies is sequentially supplied to the coil.*

*21. The apparatus of claim 20 wherein the change is detected by supplying the coil during a first interval with the AC energy at one of the predetermined frequencies, the means for sensing being activated to be responsive to energy coupled back to the coil from the tuned circuit during a second interval while the coil is not supplied with the AC energy at the one predetermined frequency.*

*22. Apparatus for determining the position of and which one of plural characteristics is included in an implement relative to a detecting surface, the implement including a tuned circuit having a predetermined resonant frequency identifying the characteristic, a different resonant frequency being associated with each characteristic, comprising* a tablet in the region for coupling energy to the implement, a coil associated with the tablet for supplying AC energy at the different resonant frequencies to the tuned circuit, the tuned circuit on the implement having substantially the same frequency as the AC energy supplied to the coil causing a change in the current flowing in the coil at said same frequency, and means for sensing the change in the current flowing in the coil at said same frequency and responding to the current change at said same frequency for indicating the identified characteristic associated with the tuned circuit with the same resonant frequency as the frequency of the applied AC energy, and responsive to energy coupled between the tablet and the implement for indicating the position of the implement relative to the tablet.

*23. The apparatus of claim 22 wherein the energy at the different frequencies is sequentially supplied to the coil.*

*24. The apparatus of claim 23 wherein the change is detected by supplying the coil during a first interval with the AC energy at one of the predetermined frequencies, the means for sensing being activated to be responsive to energy coupled back to the coil from the tuned circuit during a second interval while the coil is not supplied with the AC energy at the one predetermined frequency.*

*25. In combination, a position sensing tablet, a coil associated with the tablet, an implement having one of plural characteristics adapted to be selectively placed proximate the tablet, the tablet and the implement having structures for coupling energy between them, the implement including a tuned circuit having a resonant frequency associated with the one characteristic, different ones of said characteristics having different resonant frequencies associated therewith, means for supplying AC energy at the different resonant frequencies to the coil, the tuned circuit on the implement in proximity to the coil having substantially the same frequency as the AC energy supplied to the coil causing a change in the current flowing in the coil at said same frequency, means for sensing the change in the current flowing in the coil at said same frequency and responding to the current change at said same frequency for indicating the characteristic of the implement having the tuned circuit with the same resonant frequency as the frequency of the applied AC energy and responding to the energy coupled between the implement and the tablet for indicating the position of the implement on the tablet.*

*26. The combination of claim 25 wherein the energy at the different frequencies is sequentially supplied to the coil.*

*27. The combination of claim 26 wherein the change is detected by supplying the coil during a first interval with the AC energy at one of the predetermined frequencies, the means for sensing being activated to be responsive to energy coupled back to the coil from the tuned circuit during a second interval while the coil is not supplied with the AC energy at the one predetermined frequency.*

* * * * *

UNITED STATES PATENT AND TRADEMARK OFFICE

CERTIFICATE OF CORRECTION

PATENT NO. : Re. 33,805

DATED : January 28, 1992

INVENTOR(S) : Tsuguya YAMANAMI et al.

It is certified that error appears in the above-identified patent and that said Letters Patent is hereby corrected as shown below:

Title page:

--[30] Foreign Application Priority Data

Sep. 8, 1986 [JP] Japan..... 61-209711--.

Signed and Sealed this

Fifteenth Day of June, 1993

Attest:

Michael K. Kirk

MICHAEL K. KIRK

Attesting Officer

Acting Commissioner of Patents and Trademarks